(12) United States Patent
Abbott et al.

(10) Patent No.: US 8,175,373 B2
(45) Date of Patent: May 8, 2012

(54) USE OF DESIGN INFORMATION AND DEFECT IMAGE INFORMATION IN DEFECT CLASSIFICATION

(75) Inventors: Gordon Abbott, Pleasanton, CA (US); Christophe Fouquet, Sunnyvale, CA (US); Ori Tadmor, Los Altos, CA (US); Takuji Tada, Sunnyvale, CA (US)

(73) Assignee: KLA-Tencor Corporation, San Jose, CA (US)

( * ) Notice: Subject to any disclaimer, the term of this patent is extended or adjusted under 35 U.S.C. 154(b) by 605 days.

(21) Appl. No.: 12/371,863

(22) Filed: Feb. 16, 2009

(65) Prior Publication Data

US 2010/0208979 A1    Aug. 19, 2010

(51) Int. Cl.
*G06K 9/00* (2006.01)
(52) U.S. Cl. ............... 382/149; 356/237.4; 356/237.5
(58) Field of Classification Search ............... 356/237.1, 356/237.2–237.5, 239.1–239.3, 239.7–239.8, 356/237.4; 382/141, 144, 145–147, 149
See application file for complete search history.

(56) References Cited

U.S. PATENT DOCUMENTS

| | | | | |
|---|---|---|---|---|
| 4,587,617 A | * | 5/1986 | Barker et al. | 382/149 |
| 6,067,153 A | * | 5/2000 | Mizuno | 356/237.2 |
| 7,834,992 B2 | * | 11/2010 | Yoshida et al. | 356/237.2 |
| 2006/0007433 A1 | * | 1/2006 | Ikuta et al. | 356/237.2 |
| 2006/0159330 A1 | * | 7/2006 | Sakai et al. | 382/141 |
| 2008/0100844 A1 | | 5/2008 | Sali et al. | |

FOREIGN PATENT DOCUMENTS

| | | |
|---|---|---|
| JP | 2005-214980 | 8/2005 |
| KR | 10-2001-0106630 | 12/2001 |
| KR | 10-2007-0076711 | 7/2007 |

OTHER PUBLICATIONS

Notification of Transmittal of the International Search Report and the Written Opinion of the International Searching Authority dated Sep. 16, 2010 issued for the International Patent Application No. PCT/US2010/024291.

* cited by examiner

*Primary Examiner* — Tarifur Chowdhury
*Assistant Examiner* — Michael P Lapage
(74) *Attorney, Agent, or Firm* — Joshua D. Isenberg; JDI Patent (57) ABSTRACT

Defects observed by imaging tools may be classified by automatic comparison of features observed in a defect image with design information relating to corresponding portions of the image. Defect information may be generated from a defect image from a defect imaging tool. Design information relating to one or more structures to be formed on the substrate in a vicinity of the defect may be retrieved. The defect may be classified based on a combination of the defect information from the defect image and design information relating to one or more structures to be formed on the substrate in the vicinity of the defect.

21 Claims, 4 Drawing Sheets

USE OF DESIGN INFORMATION AND DEFECT IMAGE INFORMATION IN DEFECT CLASSIFICATION

FIELD OF THE INVENTION

This invention generally relates detecting and classifying defects for a semiconductor device and more particularly to methods for doing image-based defect classification based on a defect image and design information.

BACKGROUND OF THE INVENTION

As is well known, considerable effort is spent in academia and industry towards developing techniques enabling the detection of defects in wafers before their cleavage into distinct dies, capsulation and subsequent distribution to the marketplace in the form of chips. In recent years, defect detection has been improved by techniques for classifying defects into distinct defect types. These techniques not only allow identification of defective wafers so as to increase the yield, but also to provide some information on the cause of the defects. The production stage can then be reconfigured or modified in order to produce a better wafer series.

A conventional method for defect classification called Automatic Defect Classification applying certain algorithm to the defect image taken by a CCD camera to attempt and classify the defect. The algorithm is typically implemented by a review tool, such as a review scanning electron microscope (SEM). However, the review tool is often different from the inspection tool used to locate the defects. Thus, in order to classify the defects, the system first has to scan the entire wafer with the inspection tool, send the wafer to the review tool and re-visit the suspected sites identified during the inspection mode, take a magnified image of the defect and a reference site, and only then apply the ADC algorithm to classify the defect. In addition, the system uses only a single image of the defect from a single perspective.

Currently, defect classification is often performed by comparing a defect and reference SEM image and using various aspects of the differences to generate properties of the defect in relation to the reference that would allow classification of the defect based on a known training set. Generally ADC based on a training set is only trying to group based on defect type. One drawback to this method is that the classification is only based on comparison to prior defects. The system therefore has no knowledge of the actual design of the devices to be formed on the wafer and therefore might bin two defects of the same type as the same criticality even though they occur at two different locations on the device.

NGR2100 of NanoGeometry Research is a large scale inspection tool, which generates patchwork image of entire die using SEM and compares image to design information to find problems with design or process. However, the test is performed on a test wafer, not production wafer and the scanning process takes a significant period of time, e.g., about one day.

Thus, there is a need in the art for improved defect detection and classification. It is within this context that embodiments of the present invention arise.

BRIEF DESCRIPTION OF THE DRAWINGS

Other objects and advantages of the invention will become apparent upon reading the following detailed description and upon reference to the accompanying drawings in which.

DESCRIPTION OF THE SPECIFIC EMBODIMENTS

Although the following detailed description contains many specific details for the purposes of illustration, anyone of ordinary skill in the art will appreciate that many variations and alterations to the following details are Within the scope of the invention. Accordingly, the exemplary embodiments of the invention described below are set forth without any loss of generality to, and without imposing limitations upon, the claimed invention.

Figure 1:
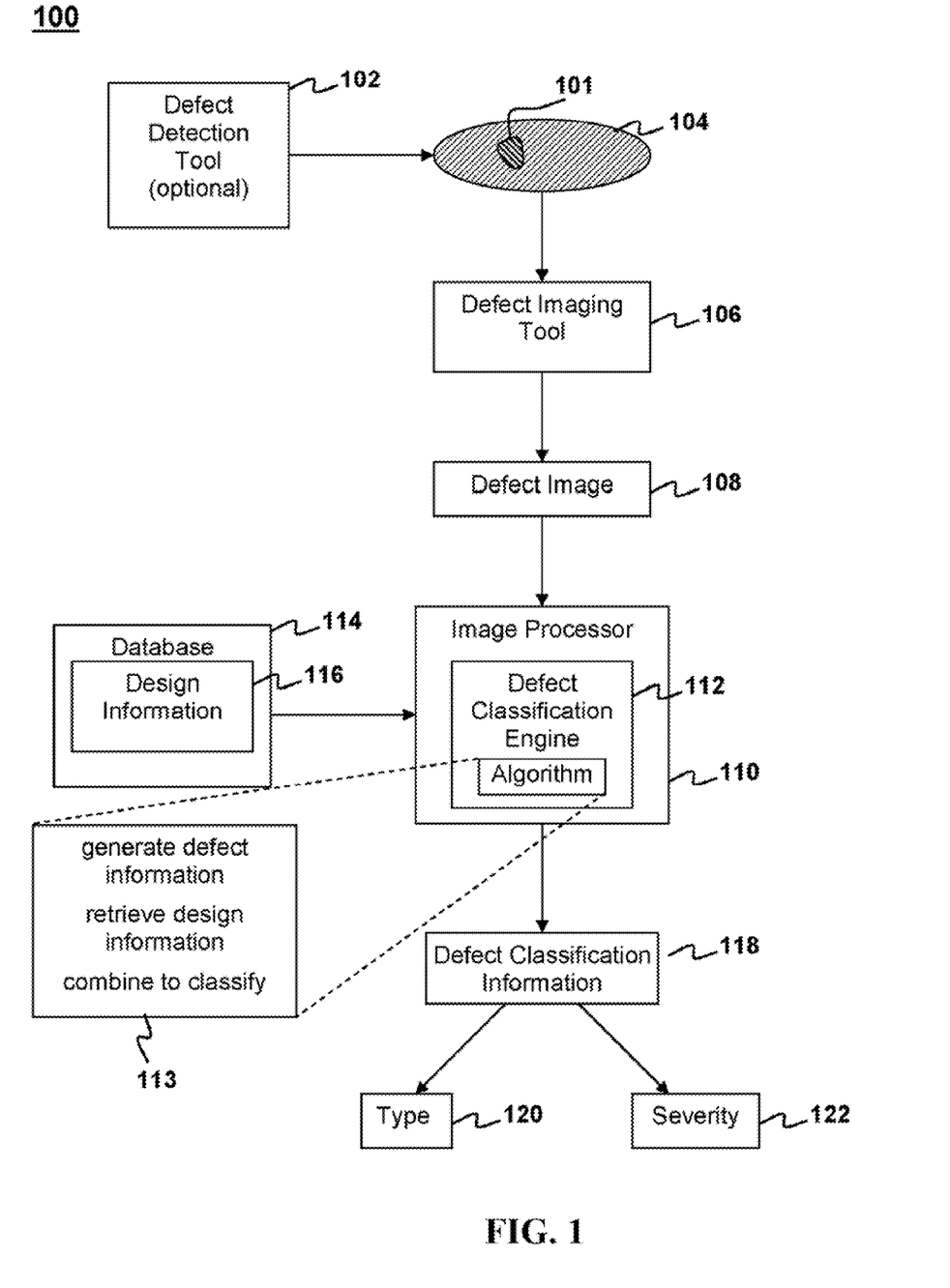
FIG. 1 is a flow diagram illustrating a method for doing SEM based defect classification according to a preferred embodiment of the present invention.

FIG. 1 is a flow diagram illustrating a process 100 for defect classification based only on a single defect image and the design information or a semiconductor device according to an embodiment of the present invention. As shown in FIG. 1, a defect 101 on a wafer 104 is optionally detected using a defect detection tool 102.

A defect imaging tool 106 may then generate a defect image 108 of the defect 101. The defect imaging tool 106 may be SEM, CD-SEM, AFM, STM, optical microscope and the like. An example of a commercially available defect imaging tool is an eDR-5200 Electron Beam Review and Classification System from KLA-Tencor Corporation of San Jose, Calif. The defect image 108 may then be transferred to defect classification server 110 for classification of defects identified in the image. The defect classification server 110 may be a general purpose computer configured to execute computer-readable instructions that implement a defect classification engine 112 that combines defect information determined from the defect image 108 with design information 116 from a database 114 to determine defect characterization information 118 that characterizes the defect 101. It is noted that a general purpose computer becomes a special purpose computer when running a defect classification engine 112 as described herein. By way of example, and not by way of limitation, the defect classification engine may be run as a Windows service and do all the processing of defect imaging tool lot results for one or more defect imaging tools 106.

The defect classification engine 112 may be implemented in the form of computer-readable instructions embodied in a computer-readable medium such as a computer memory or data storage device and executed by a computer processor. The implementation of the defect classification engine 112 software may depend on the saving of raw images in a standard format in the lot results. This allows the defect classification server 110 to programmatically access the raw images for any given defect in the lot.

The design information in the database 114 may be stored in a suitable computer-readable medium in a computer memory or mass storage device. The memory or storage device may be accessible by the defect classification engine 112. By way of example, and not by way of limitation, the database 114 may be stored on a remote server and the detect classification engine 112 may be configured link to the remote server to access the design information in the database 114.

By way of example, and not by way of limitation, the defect 101 may be classified as to type 120 or severity 122 based on the defect characterization information 118. There are a number of ways to bin the defects according to type or severity. For example, defects of a given type may be classified into different bins according to their severity. Alternatively, defects of a given severity may be classified into different types and binned according to type.

The design information 116 may take on a number of different forms. For example, the design information 116 may generally include information that describes one or more structures that are to be formed on a substrate. The design information may indicate the nominal dimensions, e.g., length, width and height, of a structure and/or the location of the structure relative to some reference point on a wafer or individual die or relative to other nearby structures. The design information 116 may also indicate the nature and type of material that makes up the structure. By way of example, and not by way of limitation, the design information may indicate whether the material that makes up a structure is to be electrically conducting or electrically insulating, optically transparent or opaque). Furthermore, the design information 116 may indicate acceptable tolerances for variation of dimensions or material properties of the structures relative to nominal design values.

The defect classification engine 112 may implement one or more defect classification algorithms 113 that utilize a combination of information from a defect image 108 and design information to characterize a defect in the image. In general, a defect classification algorithm 113 may generate defect information from the defect image 108; retrieve design information 116 relating to one or more structures to be formed on the substrate in a vicinity of a defect in the defect image; and classifies the defect based on a combination of information from the defect image 108 and the design information 116.

There are a number of ways in which the defect image 108 may be combined with the design information 116 in order to classify a defect. For example, the design information 116 relating to the size and shape of one or more structures may allow software to classify a defect based, e.g., on whether a single structure called for in the design information 116 is observed in the image 108 to be broken into multiple structures in the image or whether multiple structures called for in the design have been merged into one structure in the image 108. In addition, height information from the design information and defect image information may be compared to determine whether the defect sticks up beyond a surface of the substrate or protrudes into the substrate. Defect classification determined from comparisons may be related to either the type or severity of the defect.

Another way in which image information and design information may be combined in order to classify a defect may utilize topological design and image information. For example, topological information from a SEM image of a defect may be used in conjunction with the topological information from the device design to classify the defect. For example, a structure in the image may be compared against design information for that structure to determine whether the observed structure is too wide, too narrow, too tall, not tall enough, etc. This type of classification may be related to either the type or severity of the defect. In some cases, a comparison of the defect image 108 and design information 116 may indicate whether a defect comprises additional material added to a structure or material missing material from a structure. This type of classification may be related to either the type or severity of the defect.

In other cases, the position of edges of one or more structures in the defect image 108 may be compared to an ideal or nominal location of those edges in the design information 116 in order to classify a defect. This type of classification may be related to either the type or severity of the defect.

In still other cases, luminance determined from a portion of the defect image 108 may be compared to an expected luminance for a corresponding portion of the design information to classify the defect. This type of classification may be related to either the type or severity of the defect.

In addition, the location of a structure observed in the defect image 108 may be compared to the location of a corresponding structure in the design information 116 to classify a defect. This type of classification may be related to either the type or severity of the defect.

Furthermore, defect classification may indicate whether the defect would affect a layer to be formed in a previous or subsequent step. This type of classification may be related to either the type or severity of the defect. By way of example, and not by way of limitation, a void may be observed in a portion of a defect image. The design information may indicate that one or more structures susceptible to short circuit are formed in a layer underlying the void. The design information may further indicate that a subsequent layer is to be formed over the layer that contains the void. The defect may be severe, e.g., if the subsequent layer is a layer of conductive material since this would present the risk of a short circuit. Alternatively, the defect may be relatively benign, e.g., if the subsequent layer is a dielectric layer that would not affect the underlying structures.

The defect classification engine 112 may be configured to allow a user to mark a particular defect classification recipe for post processing. This may be a user selectable setting that operates on an entire recipe. When this setting is enabled, at the end of recipe execution a trigger message may be sent to a server that runs the defect classification engine 112 indicating the location of the defect image 108 (or information generated therefrom) to be processed by the classification engine 112. In addition a user may be able to select design information 116 from a list of design recipes available on the server that contains the design database 114.

Once a defect image has been captured, the image may be immediately analyzed before moving to the next defect. By way of example, software operating the defect imaging tool 106 may check whether the post processing flag has been set. If it has, a trigger message may be sent to the classification engine server with the location of the lot results, a tool ID, and the name of the design recipe to execute. If the defect classification server 110 is not available for any reason, an error may be reported and tool operation may continue normally.

The defect classification engine 112 may allow a user to create a new classification recipe. When a new classification recipe is created, it may be populated with known "good" default values for all editable parameters.

The user may be able to load an existing classification recipe and edit any of the available parameters on a user interface of the computer or processor that runs the defect classification engine 112. A user may be allowed to execute a save operation on the recipe, or save the recipe under a different name.

A classification recipe may contain the following data:
device design information
defect classification parameters
a flag to generate feature vectors that describe a defect, an SEM contour output flag an SEM to design alignment offset, a location of stored results (back to lot or different directory.

This data is not necessarily comprehensive and is presented here by way of example and not by way of limitation.

When a defect classification recipe is loaded and a user is viewing lot results, defect classification engine 112 may be configured to allow a user to move in the design and zoom in and out in order to find the location of a given defect image 108. The user may then be able to register this offset and save it to the recipe.

The defect classification engine 112 may work with multiple defect imaging tools. By way of example, the defect classification engine may allow a user to maintain a database of defect imaging tools. This database may include a name, description, and network path to each of the tools in the database. The defect classification engine 112 may allow a user to select a lot results from any of the tools in the tool database. Once a lot results has been selected, the user may be able to send a "load trigger" message to the defect classification engine 112 that causes that application to load that lot's results into memory. The defect classification engine 112 may be configured to allow a user to step through the lot results in sequential order by defect ID. The defect classification engine 112 may be configured to allow a user to view the SEM image, defect ID, and design at the defect location. This functionality may be configured to only show those defects reviewed on the SEM.

In some embodiments, the defect classification engine 112 may be configured to allow a user to view a rendered image of the design at the defect location. The rendered image may include all layers visible on the SEM image.

When a user is stepping through defect imaging tool lot results with a defect classification recipe loaded, the defect classification engine 112 may be configured to allow a user to execute a defect classification algorithm on a currently displayed defect. The classification algorithm may generate a report showing the results of the defect classification. These results may include the following:

An SEM image w/ design overlay;
A Defect highlighted by bounding ellipse;
An Extracted SEM contour;

These results are not necessarily comprehensive and are presented here by way of example and not by way of limitation. By way of example, and not by way of limitation, the results may be viewable on an SD-Console.

After a lot has been selected and loaded, the defect classification engine 112 may be configured to allow a user to have the option of running an SD recipe on the entire lot. A progress bar may be displayed during execution of this operation. Furthermore defect classification engine 112 may be configured to allow a user to queue up multiple lots to be processed by the defect classification engine. The defect classification engine 112 may be configured to allow a user to view the contents of the lot queue for the server to which it is connected. This may include the lot IDs to be processed as well as the tool requesting the processing. The defect classification engine 112 may be configured to provide the functionality to remove a single lot from the lot queue or to clear the entire queue. The defect classification engine 112 may be configured to allow the user to either select processed defect imaging tool lot results or the location of separately stored defect classification results.

The defect classification server 110 may be configured to display the status of the defect classification engine 112 on a suitably configured display unit. By way of example and not by way of limitation, the status may include the server operational mode, lot queue, current lot being processed and any other relevant status information.

External applications may communicate with the defect classification engine 112 using an interface, such as a NET Remoting interface. This interface may pass all the necessary data back and forth between the defect classification sender 110 and its clients. The defect classification server 110 may be configured to accept connections from multiple clients. Such a configuration may be implemented, e.g., to support the ability for multiple tools to request lot post processing. The defect classification server 110 may be configured to accept multiple requests for lot processing. These requests may be queued and processed in the order in which they were received. The queue may persist so that in the event of a restart, lot processing may continue with the next lot requested. The defect classification server 110 may optionally be configured to implement a method whereby a client can clear one or all lots from its lot queue. By way of example, and not by way of limitation, this functionality may be supported by the defect classification engine 112.

By way of example and not by way of limitation, the defect classification engine 112 may be configured to run in two different modes: setup and automation. The setup mode may be used on a console workstation connected to the defect classification server 110 to set up a classification recipe. The automation mode may be used to automatically post process lots being reviewed on a tool.

The defect classification engine 112 may be configured to default to automation mode. The defect classification engine 112 may be put into setup mode when the lot queue is empty and the user selects to manually load a lot results through the SD-Console software. If the defect classification engine 112 is in setup mode with a lot loaded, it may revert back to automation mode as soon as the current lot results are closed. When the SD-Server software is in setup mode, it will reject any requests to queue and process a lot from connected clients. When the SD-Server software is in setup mode, it will have a timer running. If there is no activity from the client software within a user definable period, the current lot results will be closed and the software will revert back to automation mode.

The defect classification algorithm used by the defect characterization engine 112 may be designed to work using a combination of defect images (e.g., SEM or optical images) as well as a rendered design image at the defect location. Examples of the sources of these images and design are described below.

By way of example, and not by way of limitation the design information 116 at any given location on a substrate may come from a connection to an image computer that manages the design information database 114. Design clips may be delivered through an interface module as polygon descriptions for each latter in the design. The defect classification engine may be configured to properly render this information as necessary for use in classification algorithms as well as for display.

A top down SEM perspective may come from the lot results for the defect imaging tool 106 and may be user selectable so that the user may select which of saved perspective image or images to use. Topographical information generated from the SEM images may be generated on the fly from raw images stored in the lot results. These EDF images may be generated using a binary module that produces the desired image from the 5 raw images.

Examples of options for output data generated by the algorithms used by the defect classification engine are now described. These options are listed for the purpose of example and are by way of limitation.

The location of the SD-Server output data for a given lot results may be user selectable.

One option the user may select for the data output is to place it back in the original lot results.

Another option may be to store the data in a separate directory from the lot results.

If the user selects to place the data somewhere other than the lot results, the user may be allowed to enter the root directory.

The output data mats contain an XML file with an entry for each defect ID reviewed on the defect imaging tool 106 in the original lot results.

The defect ID entry may contain a Boolean flag indicating whether or not a defect was found for that defect ID.

The defect ID entry may contain a name and type of any images output for that defect ID.

The defect ID entry may contain a name of a defect image contour file if there was one created for that defect. By way of example, this contour file may be in a suitable database file format for data exchange of integrated circuit or IC layout artwork. An example of such a format is the well-known GDSII formal. Those skilled in the art are familiar with this format and further description if it is not believed to be necessary.

The defect classification recipe may allow the user the option to output the detect image 108 with the design overlaid.

The defect classification recipe may allow the user the option to output the defect image 108 with defect bounding overlaid. The defect bounding may be done by creating an ellipse larger than the actual defect so that the defect can be clearly seen.

The defect classification recipe may allow the user the option to output the defect image 108 with the actual defect bounding overlaid. This may be the bounding actually detected by the defect detection tool 102 or by an algorithm used by the defect classification engine 112.

The defect classification recipe may allow the user the option to output a full defect image contour as a GDSII file for each defect. It is understood that this may increase the processing time for each image.

The defect classification recipe may also allow the user the option to output the feature vectors for each image so that it may be used with a classification engine that allows user input to develop a training set for automated classification. These feature vectors will be in the standard format used currently for feature vector output. These output files may go to a different location than the other related files if they are being written back to the original lot results.

As noted above, in some embodiments, but not all, the design information and a single defect image (e.g., an SEM image) may be used to generate synthetic reference image. The synthetic reference image may be generated using information from the defect image, such as defect location, and design information obtained, e.g., from a design database.

By way of example, and not by way of limitation, the synthetic image may be created by masking out portions of the SEM defect image based on the design information, sampling the grayscale value for the masked portions of the image, and filling portions of the rendered design image based on the grayscale values in the histograms. This should create a synthetic image with roughly the same histogram properties as a real SEM reference image and be good enough to generate classification feature vectors. It is noted that it is not necessary to form a synthetic image in order to combine information from a defect image with design information in order to classify a defect.

Figure 2A:
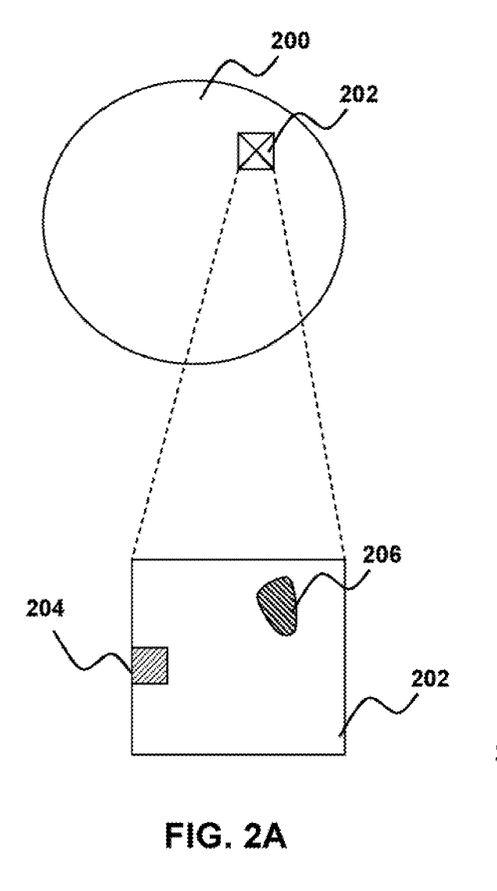
FIGS. 2A-2B are top views illustrating the location of defects on a wafer.
Figure 2B:
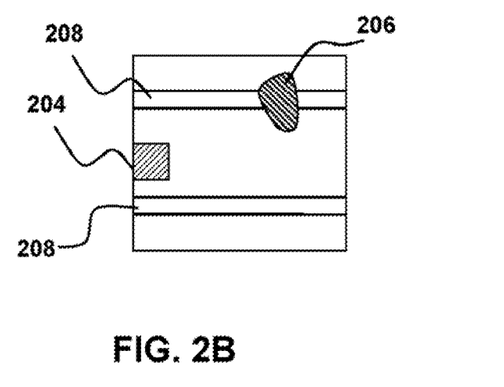

FIGS. 2A-2C illustrate an example of a method to define the location of a defect with respect to design information. As seen in FIG. 2A a wafer 200 may have a defect area 202. As shown in FIG. 2B, a first tool may locale the defects 204 and 206 on the defect area 202 to get a first coordinate of the defect 204. A second tool may image the defect 204 using the first coordinate and obtain a second coordinate. For example, as shown in FIG. 2B, the second coordinate of the defect 204 may be related to a set of conductive lines 208 located in an inner layer of the wafer 200. The second coordinate of the defect 204 from the second tool may be compared to the design information to determine the real location of the defect area 202. Alternatively, the size of the defect 204 may be compared against the size of the spacing between adjacent conductive lines 208 to determine the severity of the defect 204. In some instances, the defect 204 may not be severe if it is sufficiently smaller than the line spacing. In other instances, the defect may not be significant if the defect material is not conductive, since the defect would not present a risk of a short between adjacent conductive lines 208.

Defect classification may be implemented by comparing the defect image to the synthetic reference image to build a subset of feature vectors for later analysis. However, if a synthetic reference image is used it is not necessary to separately collect a reference image with the defect inspection tool. This allows an existing defect classification scheme to be implemented in a way that utilizes design information. This allows an existing defect classification full detection and classification capabilities while maintaining high throughput since a synthetic reference image can be generated much more quickly than a normal reference image.

The synthetic reference image may be based on both the design information and the defect image and generated in a way that attempts to replicate as closely as possible what a conventional reference image would look like if it had been collected. The basic image creation may be implemented by masking out portions of the defect image based on the design information, sampling the grayscale value for the masked portions of the image, and filling portions of the rendered design image based on the grayscale values in the histograms. This should create a synthetic image with roughly the same histogram properties as a real SEM reference image and be good enough to generate classification feature vectors.

Figure 3:
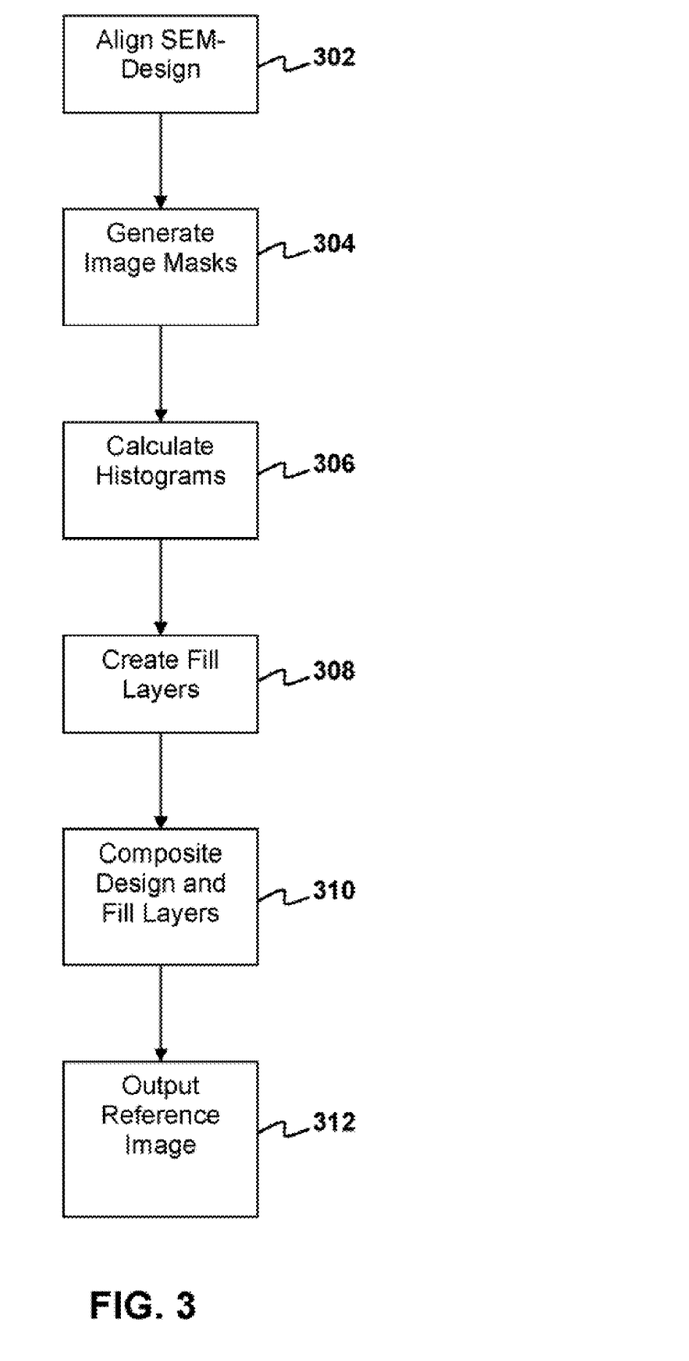
FIG. 3 is a flow diagram illustrating the steps used in creating the final synthetic reference image according to an embodiment of the present invention.

FIG. 3 is a flow diagram showing the steps used in creating a synthetic reference image. Each of these steps may be done as part of other tasks in the SD-ADL algorithm and this is not meant as a limitation to the flow of an algorithm used to implement a method according to an embodiment of the present invention. As indicated at 302, the SEM image may be aligned to the design. This may be implemented as a standard alignment of an SEM image to the design as done by the defect classification engine 112. Such alignment may be useful to properly mask out selected portions of the image for later compositing. Image masks are generated as indicated at 304. This process may be used to generate masks to isolate various portions of the image for histogram analysis and later compositing. By way of example, and not by way of limitation, the masks may include a background mask, a layer edge mask and a layer interior mask. The background mask may reveal only the background of the SEM images. There may be one or more layer edge masks per design layer. The layer edge mask may expose just the edges of that layer. There may be one interior mask for each layer in the design. Each interior mask may expose only an interior of the layer in the SEM image and exclude the edges. All of these masks may be configured to exclude the detected defect bounding.

Histograms may be created for each mask generated as indicated at 306. Fill layers or Full sized "noise" image based on average grayscale or "noise" matching the histogram distribution for each mask may be created as indicated at 308. A composite of design and fill layers are created by masking each fill image and combining to form a single image as indicated at 310. Finally, a synthetic reference image may be generated from a combination of the design, unmasked portions of the defect image and the fill layers, as indicated at 312.

Figure 4:
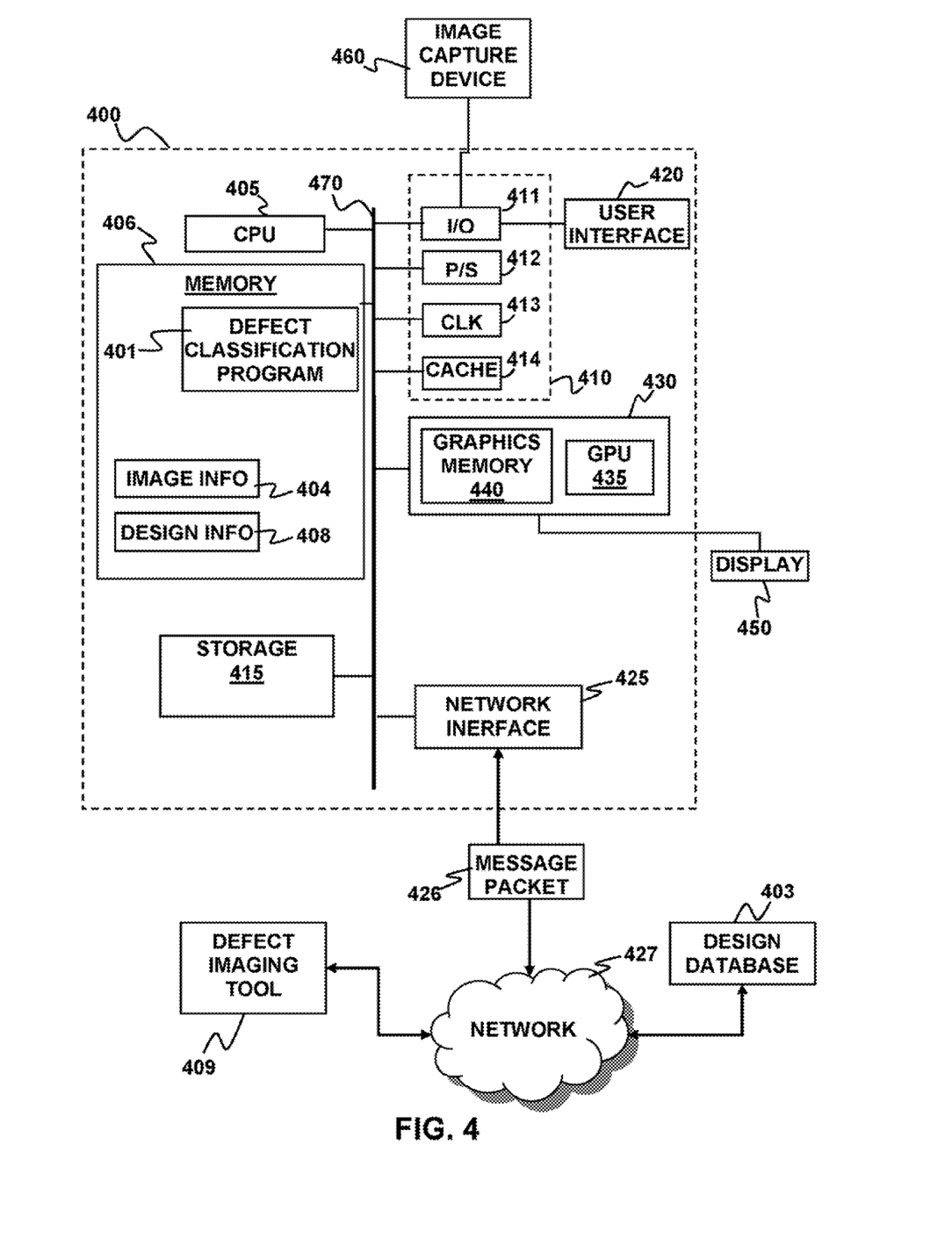
FIG. 4 is a block diagram illustrating an example of a client device according to an embodiment of the present invention.

By way of example, the defect classification server 110 described above may be implemented using an apparatus 400 as shown in FIG. 4 according to an embodiment of the present invention. By ways of example, and without loss of generality, the apparatus 400 may be implemented as a computer system, such as a personal computer, personal digital assistant, or other digital device, suitable for practicing an embodiment of the invention. The apparatus 400 may include a computer processor 405 configured to run software applications and optionally an operating system. The processor 405 may include one or more processing cores. A memory 406 may be operably coupled to the processor 405. As used herein, the memory may be said to be operably coupled to the processor if information stored in the memory may be accessed by the processor and/or the processor can selectively store information in the memory. The memory 406 may store applications and data for use by the processor 405. The memory 406 may be in the form of an integrated circuit, e.g., RAM, DRAM, ROM, and the like.

The apparatus 400 may also include well-known support functions 410, such as input/output (I/O) elements 411, power supplies (P/S) 412, a clock (CLK) 413 and cache 414. The apparatus 400 may further include a storage device 415 that provides non-volatile storage for applications and data. By way of example, the storage device 415 may be a fixed disk drive, removable disk drive, flash memory device, tape drive, CD-ROM, DVD-ROM, Blu-ray. HD-DVD, UMD, or other optical storage devices.

A computer program 401 may be stored in the memory 406 in the form of instructions that can be executed on the processor 405. The instructions of the program 401 may be configured to implement, amongst other things, certain steps of a method for classifying a defect, e.g., as described above with respect to FIG. 1, FIG. 2 and FIG. 3. In particular, the program 401 may implement a defect classification algorithm that involves generating defect information from a defect image; retrieving design information relating to one or more structures to be formed on the substrate in a vicinity of a defect in the defect image; and classifying the defect based on a combination of information from the defect image and the design information.

The program 401 may operate in conjunction with defect image information 404 and design information 408 that may be temporarily stored in the memory 406 or the data storage device 415. In some embodiments, the design information may be used for generating a synthetic defect image, as discussed above with respect to FIG. 3. By way of example, the defect image information may be generated from one or more defect images obtained by a remotely located defect imaging tool 106. Furthermore, the design information 408 may be retrieved from a design database 403, which may be maintained on a remote database server.

One or more user input devices 420 may be used to communicate user inputs from one or more users to the apparatus 400. By way of example, one or more of the user input devices 420 may be coupled to the apparatus 400 via the I/O elements 411. Examples of suitable input device 420 include keyboards, mice, joysticks, touch pads, touch screens, light pens, still or video cameras, and/or microphones. The apparatus 400 may include a network interface 425 to facilitate communication via an electronic communications network 427. The network interface 425 may be configured to implement wired or wireless communication over local area networks and wide area networks such as the Internet. The apparatus 400 may send and receive data and/or requests for files via one or more message packets 426 over the network 427. The apparatus 400 may use the network 427 to interface with the design database 403 and a defect imaging tool 409

The apparatus 400 may further comprise a graphics subsystem 430, which may include a graphics processing unit (GPU) 435 and graphics memory 440. The graphics memory 440 may include a display memory (e.g., a frame buffer) used for storing pixel data for each pixel of an output image. The graphics memory 440 may be integrated in the same device as the GPU 435, connected as a separate device With GPU 435, and/or implemented within the memory 406. Pixel data may be provided to the graphics memory 440 directly from the CPU 405. Alternatively, the CPU 405 may provide the GPU 435 with data and/or instructions defining the desired output synthetic reference images, from which the GPU 435 may generate the pixel data of one or more output images. The data and/or instructions defining the output images may be stored in memory 406 and/or graphics memory 440. In an embodiment, the GPU 435 may be configured (e.g., by suitable programming or hardware configuration) with 3D rendering capabilities for generating output synthetic reference images from defect image and design information.

The graphics subsystem 430 may periodically output pixel data for an image from the graphics memos 440 to be displayed on a video display device 450. The video display device 450 may be any device capable of displaying visual information in response to a signal from the apparatus 400, including CRT, LCD, plasma, and OLED displays. The computer apparatus 400 may provide the display device 450 with an analog or digital signal. By waif of example, the display 450 may include a cathode ray tube (CRT) or flat panel screen that displays text, numerals, graphical symbols or images. An image capture device 460 may be coupled to the apparatus 400 through the I/O functions 411. As discussed above, the image capture device 460 may be a digital camera.

The components of the apparatus 400, including the CPU 405, memory 406, support functions 410, data storage 415, user input devices 420, and network interface 425 may be operably connected to each other via one or more data buses 470. These components may be implemented in hardware, software or firmware or some combination of two or more of these.

Although some examples are described herein in terms of SEM images, embodiments of the invention are not limited to use with just this type of images. The generation of a synthetic reference image could be extended beyond SEM images to be implemented using other types of images, such as an optical image, which could be used for a reference doing optical alignment or defect detection on an optical system.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature, whether preferred or not, may be combined with any other feature, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A method for classifying a defect in a defect image of a portion of a scanned substrate from a defect imaging tool, the method comprising:
   a) generating defect information from the defect image;
   b) retrieving design information relating to one or more structures to be formed on the substrate in a vicinity of the defect; and
   c) classifying the defect based on a combination of information from the defect image and design information relating to one or more structures to be formed on the substrate in the vicinity of the defect by aligning the defect image to the design information, generating one or more image masks, calculating histograms for each image mask generated, creating fill layers from the histograms, compositing design information and the fill layers, and generating a synthetic reference image from the design information and the fill layers.

2. The method of claim 1 wherein classifying the defect includes determining a type or severity of the defect.

3. The method of claim 1 wherein the design information includes information that indicates one or more nominal dimensions or a location of one or more structures that are to be formed on the substrate and wherein c) includes comparing the one or more nominal dimensions or the location to one or more dimensions or a location of a corresponding structure in the defect image.

4. The method of claim 1 wherein the design information includes information regarding a material that makes up one or more structures that are to be formed on the substrate and wherein c) includes comparing the information regarding the material to one or more material properties of one or more corresponding structures determined from the defect image.

5. The method of claim 1 wherein the design information includes an acceptable tolerance for variation of a dimension or material property of one or more structures that are to be formed on the substrate relative to a nominal design value and wherein c) includes determining whether a corresponding dimension or material property for one or more structures observed in the defect image lies within the acceptable tolerance.

6. The method of claim 1 wherein c) includes determining whether the defect comprises additional material added to a structure called for by the design information or material missing material from the structure.

7. The method of claim 1, wherein c) includes comparing luminance determined from a portion of the defect image to an expected luminance for a corresponding portion of the design information.

8. The method of claim 1, wherein c) includes comparing a location of a structure observed in the defect image to a location of a corresponding structure in the design information.

9. The method of claim 1, wherein c) includes determining whether the defect would affect a layer formed in a previous or a layer to be formed in a subsequent step.

10. The method of claim 1 wherein a) comprises:
    i) obtaining a first coordinate corresponding to a location of the defect from a first tool;
    ii) obtaining a second coordinate from the defect image, wherein the defect image is obtained with a second tool; and
    iii) comparing the second coordinate to the design information to determining a real location of the defect.

11. The method of claim 1, wherein c) comprises: generating classification properties of the defect based on the synthetic reference image.

12. The method of claim 1 wherein a combination of the information from the defect image and the design information is used to classify the defect based on whether a structure is broken into multiple structures or whether multiple structures in the design have been merged into one structure.

13. The method of claim 1 wherein a combination of the information from the defect image and the design information is used to classify the defect based on height information.

14. The method of claim 13 wherein a combination of the information from the defect image and the design information is used to determine whether the defect sticks up beyond a surface of the substrate or protrudes into the substrate.

15. The method of claim 1 further comprising comparing a position of edges in the defect image to ideal locations of these edges in the design to classify the defect.

16. The method of claim 1 further comprising comparing a location of a structure on the substrate to a location of the same structure in the design information to classify the defect.

17. The method of claim 1 wherein a combination of the information from the defect image and the design information is used to classify whether the defect comprising additional material or missing material.

18. The method of claim 1 wherein the information from the defect image is information from a single defect image.

19. An apparatus for classifying a defect in a scanned substrate comprising:
    a computer processor;
    a memory operably coupled to the computer processor; and
    computer-readable instructions embodied in the memory for execution by the computer processor, wherein the instructions are configured to implement a method for classifying a defect in a scanned substrate, the method comprising:
    a) generating defect information from a defect image from a defect imaging tool;
    b) retrieving design information relating to one or more structures to be formed on the substrate in a vicinity of the defect; and
    c) classifying the defect based on a combination of the defect information from the defect image and design information relating to one or more structures to be formed on the substrate in the vicinity of the defect by aligning the defect image to the design information, generating one or more image masks, calculating histograms for each image mask generated, creating fill layers from the histograms, compositing design information and the fill layers, and generating a synthetic reference image from the design information and the fill layers.

20. The apparatus of claim 19 wherein the information from the defect image is information from a single defect image.

21. A non-transitory computer readable medium having computer readable instructions embodied therein for execution by a computer processor, wherein the instructions are configured to implement a method for classifying a defect in a scanned substrate, the method comprising:
    a) generating defect information from a defect image from a defect imaging tool;
    b) retrieving design information relating to one or more structures to be formed on the substrate in a vicinity of the defect; and c) classifying the defect based on a combination of the defect information from the defect image and design information relating to one or more structures to be formed on the substrate in the vicinity of the defect by aligning the defect image to a design information, generating one or more image masks, calculating histograms for each image mask generated, creating fill layers from the histograms, compositing design information and the fill layers, and generating a synthetic reference image from the design information and the fill layers.

* * * * *